UNITED STATES PATENT OFFICE.

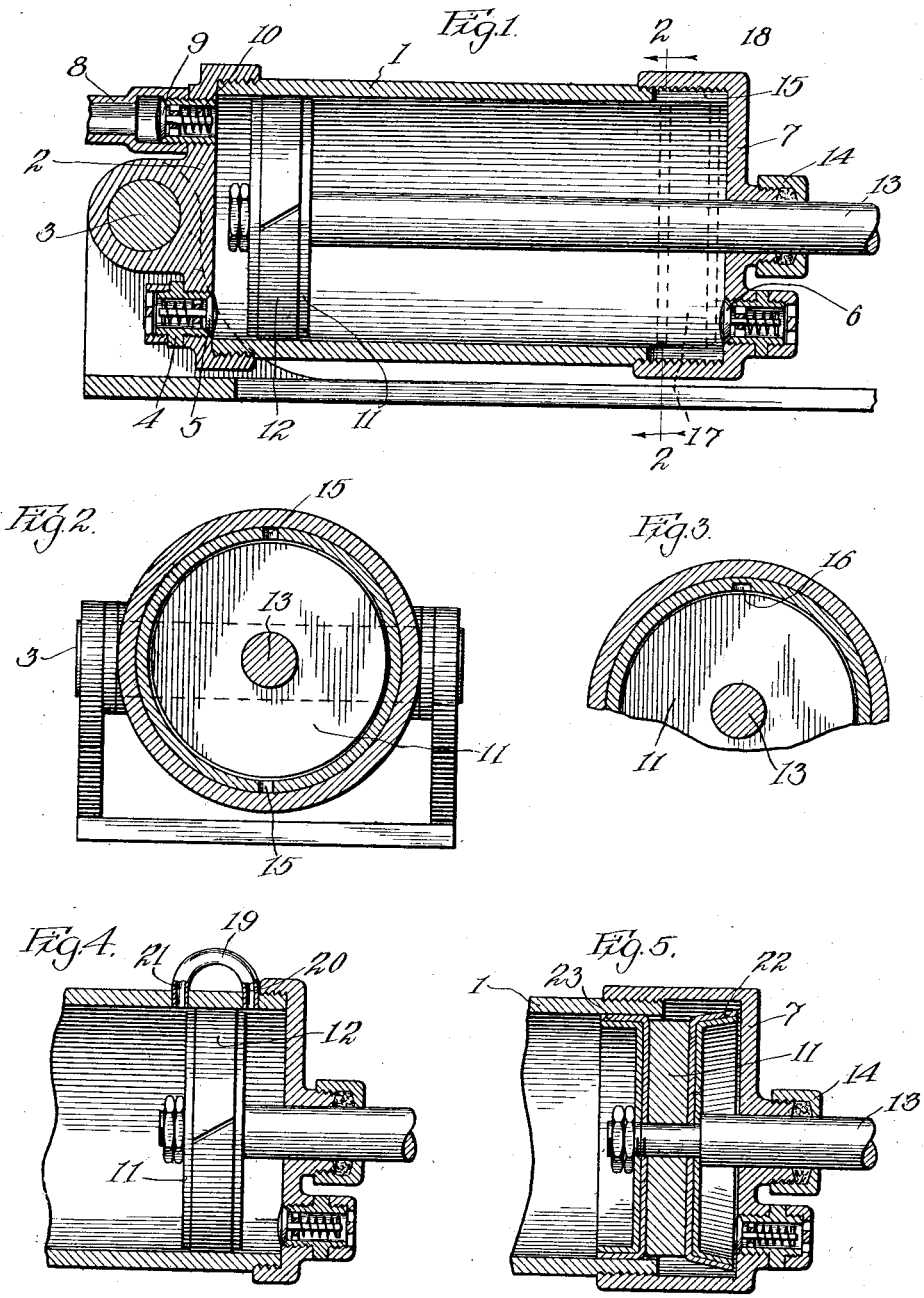

GEORGE I. HIPPLE, OF CHICAGO, ILLINOIS.

AIR-COMPRESSING PUMP.

1,182,372.     Specification of Letters Patent.     Patented May 9, 1916.

Application filed December 21, 1914. Serial No. 878,324.

*To all whom it may concern:*

Be it known that I, GEORGE I. HIPPLE, citizen of the United States, residing at Chicago, in the county of Cook and State of Illinois, have invented certain new and useful Improvements in Air-Compressing Pumps; and I do hereby declare the following to be a full, clear, and exact description of the invention, such as will enable others skilled in the art to which it appertains to make and use the same.

My invention relates to air compressing pumps, its main objects being to provide a simple and efficient construction which will enable the compressing to be effected by both strokes of the pump, which will continuously maintain some of the air within the cylinder under compression so as to produce flow of air therefrom at a considerable pressure, which will afford a cushioning at each end of the stroke so as to prevent a jarring action and to facilitate the reversing of the actuating motion, and which will cool the walls of the cylinder by the contact of an unusual amount of air against said walls.

Other objects will be apparent from the following specification and from the accompanying drawings, which show my invention as applied to a tire pump for use in connection with automobiles or the like.

In the drawings, Figure 1 is a fragmentary section through a tire pump embodying my invention. Fig. 2 is a transverse section through Fig. 1 along the line 2—2. Fig. 3 is a fragmentary section similar to Fig. 2 but showing a modified construction. Figs. 4 and 5 are fragmentary longitudinal sections showing other embodiments of my invention.

While the mechanism of my invention may be applied with substantially equal advantages to a large variety of pumps as used for compressing either air or other fluids, it is particularly suitable for quickly filling pneumatic tires with air.

The pump cylinder 1 carries at its rear end a head 2 affording a pivotal bearing upon the shaft 3. The head 2 also carries an air inlet 4 of any desired construction, but preferably equipped with a spring-pressed check valve 5, and a similar check valve 6 is mounted upon the forward head 7 of the cylinder. Connected to the rear head 2 is an outlet pipe 8 controlled by a valve 9 normally kept closed by a spring 10.

Slidably mounted within the cylinder 1 is a piston 11 equipped with at least one suitable packing ring 12 affording a tight joint between the periphery of the piston and the bore of the cylinder. Rigidly secured to the piston 11 is a piston rod 13 extending through a suitable packing box 14 in the forward head 7 and connected to suitable operating mechanism not shown for reciprocating the rod 13 and the piston attached thereto.

At or near the forward end of the cylinder 1 the latter is equipped with at least one lateral enlargement longer than the effective length of the piston, that is to say the length for which the packing ring or rings of the piston bear with an air-tight joint against the bore of the cylinder. In Figs. 1 and 2, such enlargements are shown as consisting of a pair of slots 15 disposed radially of the cylinder and extending rearwardly from the forward end of the cylinder; while in Fig. 3, a single enlargement of the bore of the cylinder is shown in the form of a groove 16 also extending longitudinally of the cylinder. In either case, it will be evident from the dotted line 17 (showing the piston in its most forward position) that in this position the said lateral enlargement of the bore will extend beyond the opposite faces of the piston, thereby affording a passage connecting the portions of the cylinder normally separated by the piston. Consequently, when the piston is moved forward, the air in front of the same will be continuously compressed until the effective rear face of the cylinder passes the rear end 10 of the enlargement 15. Then the highly compressed air in front of the piston will rush around at least one edge of the piston through the said channel formations 15, thereby filling the rear or main portion of the cylinder with air under a considerable pressure. As soon as the piston starts on its return stroke, it will act upon air already somewhat compressed, so that the effective compression attained during the rearward stroke of the piston will be very much greater than would otherwise be possible. Consequently, I am able in a comparatively short cylinder and with a quite simple mechanism to provide a pump which will exercise a very high compressing action in a very short period of time. Moreover, as soon as the air from in front of the cylinder begins to flow through the by-pass afforded by one or more of the above described lateral enlargements, the resulting pressure within the cylinder will open the check valve 9 against the resistance of the spring 10, so that the flow of air through the outlet pipe 8 will occur for a greater length of time than that occupied by the single return stroke of the piston, thus insuring a more continuous compressing action upon the tire or other element to which the outlet pipe 8 may be connected.

It will be obvious that after the piston gets started on its forward movement, the valve 5 will admit a fresh supply of air to the rear of the cylinder, while the piston inlet valve 6 will admit air to the forward end of the cylinder as soon as the piston is well started on its rearward stroke. It will also be evident that the air which has been compressed in front of the piston, when rushing through the lateral passages and filling the rear portion of the cylinder with air under pressure, will to a large extent contact with the inner walls of the cylinder 1. By this means, I obtain an added cooling action which greatly reduces the amount of heating otherwise found in pumps of this description.

While I have shown and described the cylinder of my pump as equipped with longitudinal grooves affording lateral by-pass passages, I do not wish to be limited to this particular arrangement, nor to other details of the construction herein disclosed, as the same might be modified in many ways without departing from the spirit of my invention. For example, the by-pass might be equipped with a tube 19 connecting a pair of openings 20 and 21 separated longitudinally of the cylinder by a greater distance than the effective length of the piston, which openings would then correspond to the end portions of the recesses 15 or 16. Such a construction is shown in Fig. 4, while Fig. 5 shows another embodiment in which the entire forward end of the cylinder is enlarged so that it will only loosely house such portion of the piston as may reach this enlarged portion of the cylinder when the piston is at or near the forward limit of its travel. In this case, the piston 11 is shown as equipped with a pair of cupped leather washers 22 and 23, each of which washers is adapted to be flexed outwardly when the side of the piston upon which it is mounted faces the direction of the stroke of the piston. Consequently, while the piston is being moved forward, the washer 22 will be expanded so as to engage the bore of the cylinder 1 tightly, but will be loose within the enlarged forward portion of the cylinder when the piston reaches the position of Fig. 5. Then the air compressed within the forward part of the cylinder will be passed around the outside of the washer 22 and the main portion 11 of the piston and will flex the companion packing 23 inwardly so as to permit the air to pass entirely around the piston. It will thus be evident that this construction will afford an annular by-pass extending entirely around the periphery of the piston. However, I preferably arrange the by-pass in such a way that the walls of the cylinder will afford a continuous guide for the packing or resilient portion of the piston throughout the stroke of the latter.

I claim as my invention:

1. In an air compressor, a cylinder, a piston movable back and forth in the cylinder and having pressure tight contact therewith, said cylinder having valve controlled inlet ports at each end, and a valve controlled outlet port at the rear end only and means controlled by the piston for permitting the air compressed in front of the piston to flow to the rear side thereof when the piston reaches the forward limit of its movement, whereby for each backward movement of the piston substantially two cylinder capacities will be discharged through the outlet.

2. In an air compressor, a cylinder, a piston movable back and forth in the cylinder and having pressure tight contact therewith, said cylinder having valve controlled inlet ports at each end, and a valve controlled outlet port at the rear end only, and a by-pass controlled by the piston for causing the air compressed in front of the piston to flow to the rear side thereof, when the piston reaches the forward limit of its movement, whereby the piston will discharge a volume of air, at each backward stroke, equal substantially to twice the piston displacement.

3. In an air compressor, a cylinder, a piston movable back and forth in the cylinder and having pressure tight contact therewith, said cylinder having valve controlled inlet ports at each end, and a valve controlled outlet port at the rear end only, and a by-pass in the forward end of the cylinder controlled by the piston, whereby the air compressed in front of the piston is caused to flow to the rear side thereof when the piston reaches the forward limit of its movement.

In testimony whereof I have signed my name in presence of two subscribing witnesses.

GEORGE I. HIPPLE.

Witnesses:
ALBERT SCHEIBLE,
M. M. BOYLE.